April 22, 1958     M. M. KONICK ET AL     2,831,259
MEANS FOR CHECKING AN INTERNAL SPIRAL GROOVE
Filed Feb. 14, 1956     3 Sheets-Sheet 1
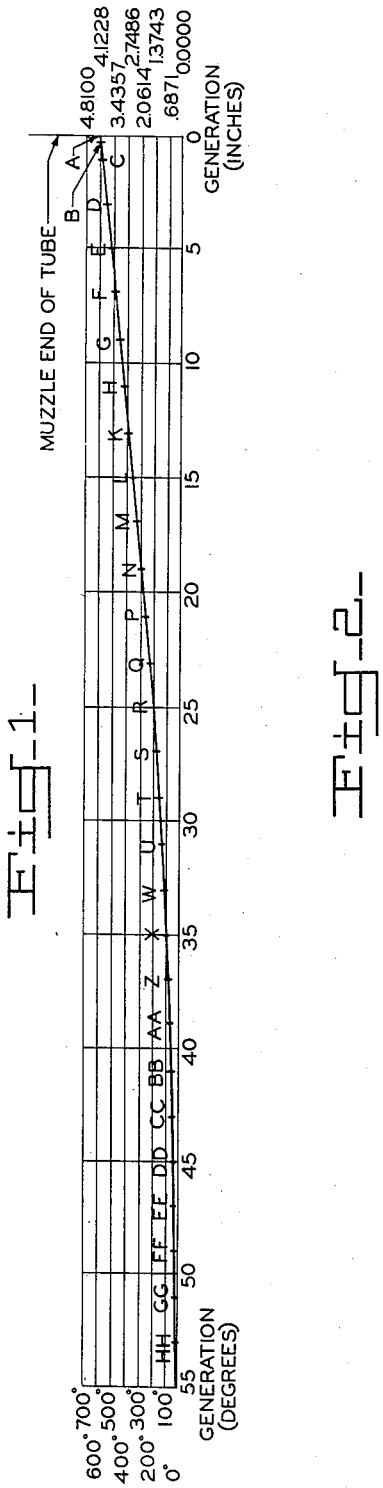
INVENTOR.
Marvin M. Konick
Seymour Seidman
BY
P. E. Thibodeau & A. W. Dew
ATTORNEYS.

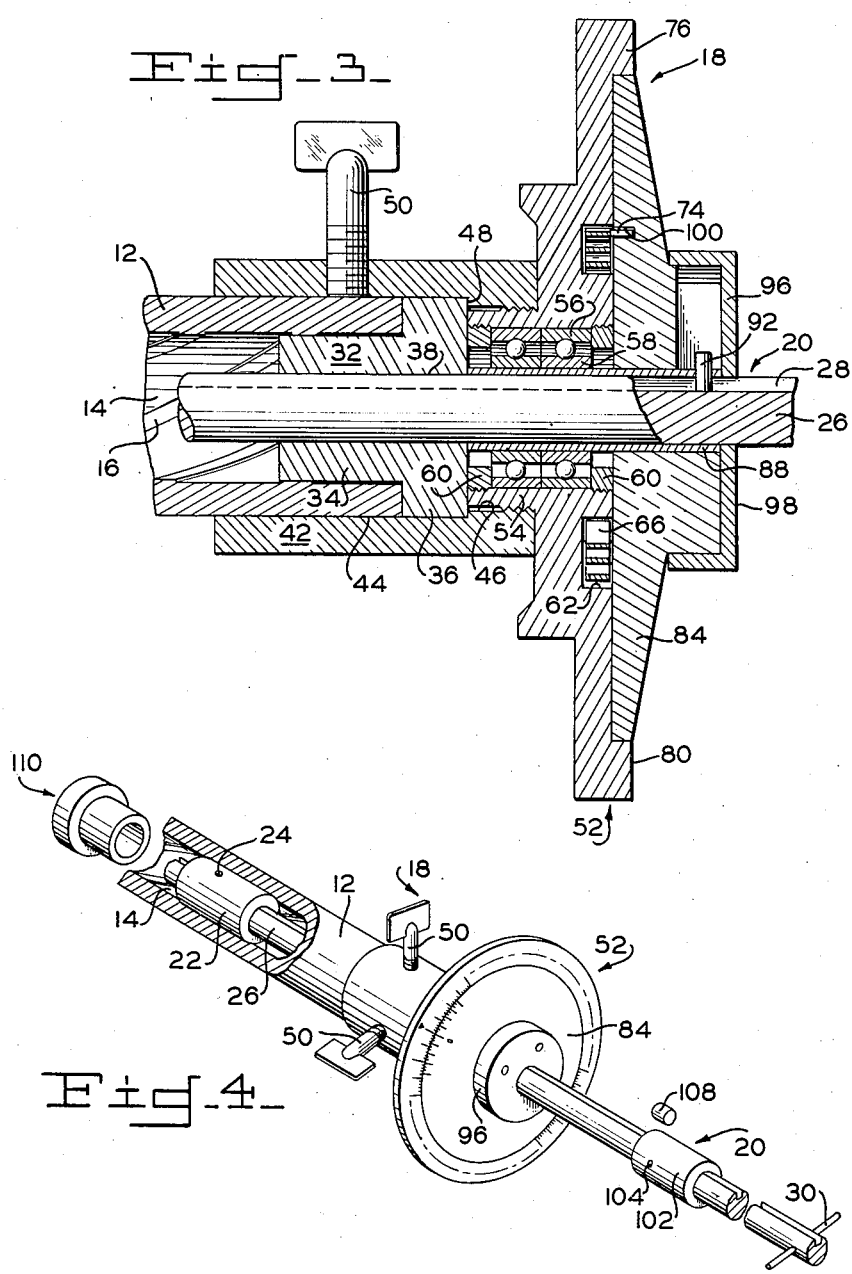

April 22, 1958     M. M. KONICK ET AL     2,831,259
MEANS FOR CHECKING AN INTERNAL SPIRAL GROOVE
Filed Feb. 14, 1956     3 Sheets-Sheet 3
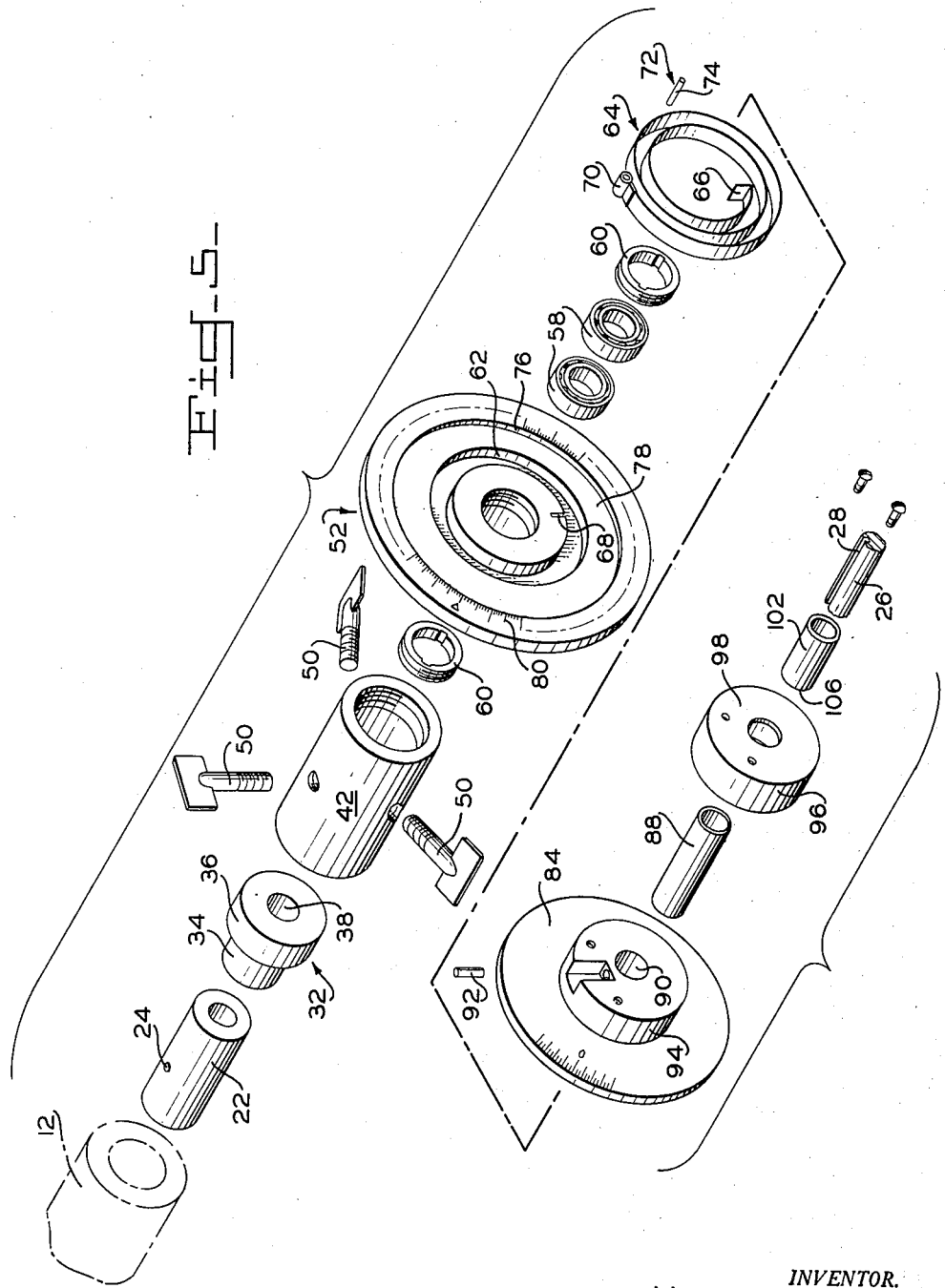
INVENTOR.
Marvin M. Konick
Seymour Seidman
BY
W. E. Thibodeau & A. W. Lew
ATTORNEYS United States Patent Office 2,831,259
Patented Apr. 22, 1958

2,831,259

MEANS FOR CHECKING AN INTERNAL SPIRAL GROOVE

Marvin M. Konick and Seymour Seidman, Springfield, Mass., assignors to the United States of America as represented by the Secretary of the Army Application February 14, 1956, Serial No. 565,512

3 Claims. (Cl. 33—174)

(Granted under Title 35, U. S. Code (1952), sec. 266)

The invention described herein may be manufactured and used by or for the Government for governmental purposes without the payment of any royalty thereon.

This invention relates to gages and gaging methods and more particularly to gages and methods for measuring the angles of the twist along the length of a cylindrical spiral.

With the development of gun barrels in which the rifling has a spiral of nonuniform angular displacement, it has been necessary to develop new methods of specifying the desired character of the twist and new means and methods for checking the machined rifling to determine whether it conforms to the specification.

Several methods have been devised for specifying the angles of twist of the rifling along the barrel. In these methods the rifling is sometimes illustrated by a graph and sometimes by tabulation with the barrel divided into predetermined stations starting from a zero point of reference. In such specification there is indicated at each of the stations the angle of the twist, in reference to the zero point of reference, or the circumferential distance from such zero point.

Heretofore, however, there has not been provided any adequate means or methods of adequately checking the twist of the rifling against the specification that would be suitable for both laboratory and production line application.

It is, therefore, an object of this invention to provide an accurate yet easily operated gage for measuring the twist of an internal spiral groove along the length thereof.

It is also an object of this invention to provide a method of checking nonuniform twist of the rifling of a gun barrel along the length thereof which would conform to a system of specification suitable for manufacturing purposes.

The specific nature of the invention as well as other objects and advantages thereof will clearly appear from a description of a preferred embodiment as shown in the accompanying drawings in which:

Fig. 1 illustrates a specification for a gun barrel wherein the twist of the rifling is shown by graph means through a development of the rifling;

Fig. 2 illustrates a specification wherein the twist of the rifling is shown by tabular means;

Fig. 3 is a longitudinal cross-sectional side view of the gage of this invention;

Fig. 4 is a reduced perspective view of the gage; and

Fig. 5 is a reduced exploded view of the gage.

Shown in the figures is a gun barrel 12 which is fifty-five inches long and has a 20 mm. bore 14 in which the rifling 16 has a twist that varies along such barrel according to the specification illustrated by Figs. 1 and 2 wherein the zero reference station HH is fifty-three inches from the muzzle end or two inches from the breech end. Mounted to the muzzle end of barrel 12, as hereinafter described, is a gage 18 for measuring the angles of the twist of rifling 16 at the designated stations HH through A along bore 14. Gage 18 includes a plunger 20 having a cylindrical head 22, which is slightly smaller in diameter than bore 14 so as to be slidable therealong and a rod 26 of greater length than barrel 12, which extends axially from such head. A keyway 28 is provided longitudinally along the length of rod 26 and a bar 30 extends diametrically through the free end of such rod to provide handle means for plunger 20. Extending radially from head 22, exactly one inch from the end thereof, is a guide pin 24 which is slidably received by rifling 16 and thereby rotates such head according to the spiral of rifling 16 during movement of head 22 along bore 14.

Replaceably mounted to the muzzle of barrel 12 is a cylindrical bushing 32 having a portion 34 receivable by bore 14 and a larger diameter portion 36 which is not greater in diameter than such muzzle end. Provided axially through bushing 32 is a bore 38 which slidingly receives rod 26 and thereby provides a centering mount for such rod when plunger 20 traverses bore 14.

Gage 18 also includes a sleeve 42 which is provided with a stepped bore having a portion 44 which receives the muzzle end of barrel 12 and bushing 32 and a smaller diameter threaded portion 46 extending from portion 44 to form an annular shoulder 48 which is engageable with the front end of such bushing. Three equally-spaced thumb screws 50 are threaded radially through sleeve 42 so as to be tightenable against barrel 12 and thereby secure such sleeve thereto. Shoulder 48 also assists in maintaining bushing 32 immovable against the muzzle of barrel 12.

Mounted to the front end of sleeve 42 is a protractor 52 having a rearwardly extending hub portion 54 which is threadably mounted into portion 46 of sleeve 42. Provided axially through protractor 52 is a cylindrical hole 56 and pressed thereinto is a pair of ball bearing assemblies 58 which are secured within such hole by a pair of retainers 60 threaded thereinto. Cut into the front face of protractor 52, concentric with the axis thereof, is an annular recess 62 which receives a coil spring 64 having at the inner end an extending tab portion 66 which is received by a slot 68 extending inwardly from such recess. The outer end of spring 64 is terminated by an eye portion 70 in which there is pressed a pin 72 having a portion 74 which extends forwardly from such eye portion.

Extending around the perimeter of protractor 52 is an annular flange 76 which forms a shallow well 78 in the front face of such protractor. The front face of flange 76 is arranged to form a planar surface 80 which is disposed diametrically to protractor 62, and inscribed on such surface is a protractor scale 82 which is laid out in increments of degrees and minutes. Rotatably received by well 78 is a circular indicator member 84 which has a diameter approximately the same as such well and the perimeter thickness of such indicator is similar to that of flange 76. Whereby, the outer perimeter of such indicator 84 and inside perimeter of flange 76 are closely related so that a vernier scale 86 inscribed around the perimeter of such indicator is readily related to protractor scale 82. Vernier scale 86 is marked so that the rotation of indicator 84 may be measured to five minutes.

Pressed through the inner races of ball bearing assemblies 58, is a bushing 88 which has a journal fit with rod 26 passing therethrough and such bushing extends forwardly from such ball bearing assemblies so as to be snugly received by an axial bore 90 through indicator 84. A cylinder key 92 is pressed through aligned holes in bushing 88 and a nave portion 94 which extends forwardly from indicator 84 and such key projects inwardly to be slidably received by keyway 28 in rod 26. Replaceably mounted over nave 74 is a cup-like cover 96 having an accurately machined face portion 98 which is diametrically disposed to rod 26 passing therethrough.

When indicator 84 is positioned in well 78 and is secured for rotation to protractor 52 by means of ball bearing assemblies 58 and bushing 88, portion 74 of pin 72 is received by a mating hole 100 in the inner face of such indicator. Whereby, when spring 64 is wound by rotation of indicator 84, the tension of such spring biases the indicator to press key 92 against one side of keyway 28 and pin 24 against one side of rifling 16 when plunger 20 traverses bore 14. Thus, although the parts of gage 18 are accurately machined for close tolerances, the tension of spring 64 removes those tolerances which are necessary for the assembly and operation of the gage.

A cylindrical marker 102 is slidably mounted on rod 26 between indicator 84 and bar 30 and is securable in position along such rod by a set screw 104. The rear face of marker 102, noted at 106, is accurately machined so as to be diametrically disposed to rod 26. Whereby, plunger 20 may traverse bore 14 of barrel 12 in exact intervals, according to the stations of the specification, by the insertion of one of a selected series of accurate measures 108, which conform to the distances of such stations from station HH between the front face 98 of cover 96 and rear face 106 of marker 102 and engaged thereby.

*Operation*

The twist of rifling 16 is checked against the specification for barrel 12 as follows: With the parts of gage 18 assembled, as hereinbefore described, and mounted to the muzzle of barrel 12, plunger 20 is moved down bore 14 until the end of head 22 contacts a depth gage 110 which is arranged to extend into bore 14 from the breech exactly one inch. As pin 24 is located one inch from the end of head 22 when such head is in contact with depth gage 110, pin 24 is positioned exactly two inches from the breech of bore 14, or at station HH according to the specification. Protractor 52 is then rotated on barrel 12 until protractor scale 82 thereon is zeroed with vernier scale 86 and thumb screws 50 then tightened to secure such protractor to the barrel. Marker 102 is next moved along rod 26 into engagement with front face 98 of cover 96 and secured in position by set screw 104. Gage 18 is now zeroed relative to station HH in the specification.

Plunger 20 is next pulled forwardly by means of bar 30 to a distance slightly greater than the distance of station GG from station HH and the one of the measures 108 for station GG, which is two inches long, placed between cover 96 and marker 102. Plunger 20 is then retracted into bore 14 until the selected measure is engaged by face 98 of the cover and rear face 106 of marker 102. During the movement of plunger 20 along bore 14, pin 24 transfers the angular displacement of rifling 16 through keyway 28 and key 92 to indicator 84 and the amount of the angular displacement is readable to five minutes by means of vernier scale 86 and protractor scale 82. If the generation of the rifling twist is correct, according to the specification shown in Figs. 1 and 2, gage 18 will read 2° and 35'.

When the reading for the first station is made, the one of the measures 108 for station GG is replaced with that for station FF and the reading taken for that station. This is continued until readings have been taken at all of the stations. By protractor 52 being secured to barrel 12 and marker 102 to rod 26 and by having separate measures for each of the stations, any one of the stations may be rechecked without rezeroing gage 18 and the readings will be identical. Sometimes the readings vary from those of the specification because station HH is not properly positioned relative to the length of barrel 12. This, however, may be ascertained by moving plunger 20 to a position in bore 14 where the reading of protractor 52 coincides with that for one of the intermediate stations. The position of pin 24 in head 22 is then ascertained by measuring the distance from the breech end of barrel 12 to the end of such head taking into consideration the distance of pin 24 from the end of such head, which is one inch. The distance measured is then checked against the distance for the selected station, according to the specification.

If desired, protractor scale 82 and vernier scale 86 may be readable in inches to measure the circumferential distance of rifling 16 from station HH at the following stations when the twist is specified linearly rather than angularly, as shown by Fig. 1. Also, where the rifling is plotted graphically without providing reference stations along the length thereof, a series of predetermined reference stations may be established for checking purposes and gage 18 used as hereinbefore described. Moreover, where the specification for the rifling 16 is not available, the twist thereof may be plotted by checking the angularity thereof along bore 14 at specific reference stations by means of measures 108 and a graph drawn therefrom.

From the foregoing it is clearly apparent that there is herein provided a gage and method for measuring the twist of the rifling of a barrel bore which is simple in operation yet extremely accurate.

Although a particular embodiment of the invention has been described in detail herein, it is evident that many variations may be devised within the spirit and scope thereof and the following claims are intended to include such variations.

We claim:

1. A gage for checking the twist of a spiral groove along a bore against the specification therefor where the specification provides by graph means the angles of the twist along the groove at predetermined stations starting from a zero point of reference of known distance from the end of the bore including a plunger for traversing the bore, a pin mounted to said plunger and received by the groove for transferring the twist of the groove to said plunger while traversing the bore, protractor means for measuring the rotation of said plunger, a gage cooperating with said plunger for positioning said pin at a position in the bore corresponding to the zero point of reference, and means for accurately positioning said pin along the bore in intervals corresponding to the stations of the specification.

2. A gage for checking the twist of a spiral groove along a bore against the specification therefor where the specification provides the angles of the twist along the groove at predetermined stations starting from a zero point of reference of known distance from the end of the bore including a plunger for traversing the bore, a pin mounted to said plunger and received by the groove for transferring the twist of the groove to said plunger while traversing the bore, protractor means for measuring the rotation of said plunger, a gage cooperating with said plunger for positioning said pin at a position in the bore corresponding to the zero point of reference, a marker mounted for adjustable movement along said plunger for zeroing said pin relative to said position, and a series of measures having lengths corresponding to the distances from said zero point of reference to the stations and being selectively engageable between said protractor means and said marker for positioning said pin along the bore in intervals corresponding to the stations of the specification.

3. A gage for checking the twist of a spiral groove along a bore against the specification therefor where the specification provides the angles of the twist along the groove at predetermined stations starting from a zero point of reference of known distance from the end of the bore including a plunger for traversing the bore, a pin mounted to said plunger and received by the groove for transferring the twist of the groove to said plunger while traversing the bore, a keyway extending longitudinally along said plunger, a protractor for measuring the rotation of said plunger, means for rotatably mounting said protractor relative to the bore and for zeroing said protractor relative to a selected position of said pin, a key mounted to said protractor and slidably received by said keyway for transferring rotation of said plunger to said protractor to measure the angular displacement of the groove as said plunger traverses the bore, spring means for simultaneously biasing said pin against one side of said groove and said key against one side of said keyway, a gage cooperating with said plunger for positioning said pin at a position in the bore corresponding to the zero point of reference in the specification, a marker mounted for adjustable movement along said plunger for zeroing said pin relative to said position, and a series of measures having lengths corresponding to the distances from said zero point of reference to the stations and being selectively engageable between said protractor and said marker for positioning said pin along the bore in intervals corresponding to the stations of the specification.

References Cited in the file of this patent

UNITED STATES PATENTS

| | | |
|---|---|---|
| 2,239,811 | Cuppers | Apr. 29, 1941 |

FOREIGN PATENTS

| | | |
|---|---|---|
| 2,934 | Great Britain | 1901 |
| 727,266 | Germany | Oct. 30, 1942 |
| 745,828 | Germany | May 26, 1944 |